United States Patent
Bian et al.

(10) Patent No.: US 10,989,872 B1
(45) Date of Patent: Apr. 27, 2021

(54) WAVEGUIDE BENDS WITH MODE CONFINEMENT

(71) Applicant: GLOBALFOUNDRIES U.S. Inc., Santa Clara, CA (US)

(72) Inventors: Yusheng Bian, Ballston Lake, NY (US); Ajey Poovannummoottil Jacob, Watervliet, NY (US)

(73) Assignee: GLOBALFOUNDRIES U.S. INC., Santa Clara, CA (US)

( * ) Notice: Subject to any disclaimer, the term of this patent is extended or adjusted under 35 U.S.C. 154(b) by 0 days.

(21) Appl. No.: 16/657,291

(22) Filed: Oct. 18, 2019

(51) Int. Cl.
*G02B 6/125* (2006.01)
*G02B 6/12* (2006.01)
*G02B 6/13* (2006.01)

(52) U.S. Cl.
CPC ......... *G02B 6/125* (2013.01); *G02B 6/12004* (2013.01); *G02B 6/13* (2013.01); *G02B 2006/12035* (2013.01); *G02B 2006/12147* (2013.01)

(58) Field of Classification Search
None
See application file for complete search history.

(56) References Cited

U.S. PATENT DOCUMENTS

| | | | | |
|---|---|---|---|---|
| 4,810,049 A | * | 3/1989 | Fischer | G02B 6/125 385/132 |
| 4,906,062 A | * | 3/1990 | Young | G02B 6/125 385/130 |
| 4,999,686 A | * | 3/1991 | Autier | G02B 6/125 385/130 |
| 5,015,052 A | * | 5/1991 | Ridgway | G02F 1/0356 385/2 |
| 6,621,972 B2 | * | 9/2003 | Kimerling | G02B 6/12 385/129 |
| 7,177,490 B2 | * | 2/2007 | Sugiyama | G02B 6/12007 385/131 |
| 7,817,879 B2 | * | 10/2010 | Sugiyama | G02B 6/125 385/9 |
| 10,191,213 B2 | * | 1/2019 | Ellis-Monaghan | G02B 6/125 |

(Continued)

FOREIGN PATENT DOCUMENTS

JP 2002286958 A * 10/2002

OTHER PUBLICATIONS

Yusheng Bian et al., "Waveguide Bends With Mode-Confining Structures" filed Jul. 3, 2018 as U.S. Appl. No. 16/026,596.

(Continued)

*Primary Examiner* — Tina M Wong
(74) *Attorney, Agent, or Firm* — Thompson Hine LLP; Anthony Canale

(57) ABSTRACT

Structures for a waveguide bend and methods of fabricating a structure for a waveguide bend. A waveguide bend is connected to a waveguide core. A slab layer, which is thinner than the waveguide bend, is coupled to the waveguide core and the waveguide bend. The slab layer includes a first curved opening and a second curved opening that is positioned between the first curved opening and a side surface of the waveguide bend. A section of the slab layer is positioned between the first and second curved openings. The first curved opening has a first radius, and the second curved opening has a second radius that is greater than or less than the first radius of the first curved opening.

20 Claims, 5 Drawing Sheets

(56) References Cited

U.S. PATENT DOCUMENTS

| | | | |
|---|---|---|---|
| 10,436,982 B1 | 10/2019 | Bian et al. | |
| 10,613,273 B2* | 4/2020 | Mentovich | H01S 5/0262 |
| 2003/0174925 A1* | 9/2003 | Lee | G02B 6/122 |
| | | | 385/14 |
| 2004/0076394 A1* | 4/2004 | Carniel | G02B 6/125 |
| | | | 385/129 |
| 2004/0208465 A1* | 10/2004 | Logvin | G02B 6/125 |
| | | | 385/129 |
| 2006/0133726 A1* | 6/2006 | Sugiyama | G02B 6/1342 |
| | | | 385/32 |
| 2007/0031083 A1* | 2/2007 | Logvin | G02B 6/125 |
| | | | 385/32 |
| 2007/0104407 A1* | 5/2007 | Mitomi | G02B 6/125 |
| | | | 385/8 |
| 2007/0297720 A1* | 12/2007 | Sugiyama | B82Y 20/00 |
| | | | 385/32 |
| 2012/0027344 A1* | 2/2012 | Krijn | G02B 6/125 |
| | | | 385/32 |
| 2015/0192735 A1* | 7/2015 | Ellis-Monaghan | G02B 6/122 |
| | | | 385/14 |
| 2019/0310418 A1* | 10/2019 | Karimelahi | G02B 6/126 |
| 2020/0012045 A1* | 1/2020 | Bian | G02B 6/125 |
| 2020/0124796 A1* | 4/2020 | Bian | G02B 6/125 |
| 2020/0166702 A1* | 5/2020 | Jacob | G02B 6/125 |

OTHER PUBLICATIONS

Yusheng Bian et al., "Multimode Waveguide Bends With Features to Reduce Bending Loss" filed Jun. 14, 2019 as U.S. Appl. No. 16/441,678.

Wu et al., "Meta-surface-enabled ultra-sharp multimode waveguide bends on silicon" arXiv:1811.06914, (2018).

Jiang, et al., "Slab-Modulated Sidewall Bragg Gratings in Silicon-on-Insulator Ridge Waveguides," in IEEE Photonics Technology Letters, vol. 23, No. 1, pp. 6-8, Jan. 1, 2011.

Hastings et al., "Optical waveguides with apodized sidewall gratings via spatial-phase-locked electron-beam lithography" Journal of Vacuum Science & Technology B: Microelectronics and Nanometer Structures Processing, Measurement, and Phenomena 20, 2753 (2002).

Brimont, et al., "Low-Loss and Compact Silicon Rib Waveguide Bends", IEEE Photonics Technology Letters. 28 (3):299-302, (2016).

Penades, et al., "Suspended silicon mid-infrared waveguide devices with subwavelength grating metamaterial cladding," Opt. Express 24, 22908-22916 (2016).

Akiyama, et al., "12.5-Gb/s operation with 0.29-V•cm V$\pi$L using silicon Mach-Zehnder modulator based-on forward-biased pin diode," Opt. Express 20, 2911-2923 (2012).

Bian et al., "Waveguide Structures" filed Aug. 23, 2019 as U.S. Appl. No. 16/539,466.

\* cited by examiner

WAVEGUIDE BENDS WITH MODE CONFINEMENT

BACKGROUND

The present invention relates to photonics chips and, more specifically, to structures for a waveguide bend and methods of fabricating a structure for a waveguide bend.

Photonics chips are used in many applications and systems such as data communication systems and data computation systems. A photonics chip integrates optical components, such as waveguides, optical switches, directional couplers, and waveguide bends, and electronic components, such as field-effect transistors, into a unified platform. Among other factors, layout area, cost, and operational overhead may be reduced by the fabrication of both types of components on a shared chip.

On-chip communication and sensing may rely on guiding optical signals through waveguides on the photonics chip to other optical components. Optical signals may propagate as electromagnetic waves within waveguides using several different modes that are characterized by distinct properties. Transverse electric (TE) modes are dependent upon transverse electric waves in which the electric field vector is oriented perpendicular to the direction of propagation. Transverse magnetic (TM) modes are dependent upon transverse magnetic waves in which the magnetic field vector is oriented perpendicular to the direction of propagation.

Optical signals guided by a waveguide bend may experience bending loss. Bending loss may be reduced by increasing the bending radius during the design phase. However, increasing the bending radius increases the form factor of the waveguide bend. A waveguide bend with a core fabricated from single-crystal silicon may include a slab layer of partially-etched single-crystal silicon coupled to the base of the core. Bending loss may be exacerbated due to mode leakage into the slab layer.

Improved waveguide bends and methods of fabricating waveguide bends are needed.

SUMMARY

In an embodiment of the invention, a structure includes a waveguide core and a waveguide bend that is connected to the waveguide core. A slab layer, which is thinner than the waveguide bend, is coupled to the waveguide core and the waveguide bend. The slab layer includes a first curved opening and a second curved opening positioned between the first curved opening and a side surface of the waveguide bend. A section of the slab layer is positioned between the first and second curved openings in the slab layer. The first curved opening has a first radius, and the second curved opening has a second radius that is greater than or less than the first radius of the first curved opening.

In an embodiment of the invention, a method includes forming a waveguide core, a waveguide bend that is connected to the waveguide core, and a slab layer coupled to the waveguide core and the waveguide bend. The method further includes forming a first curved opening in the slab layer and a second curved opening in the slab layer that is positioned between the first curved opening and a side surface of the waveguide bend. The slab layer is thinner than the waveguide bend. A section of the slab layer is positioned between the first and second curved openings in the slab layer. The second curved opening has a second radius that is greater than or less than a first radius of the first curved opening.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

DETAILED DESCRIPTION

Figure 1:
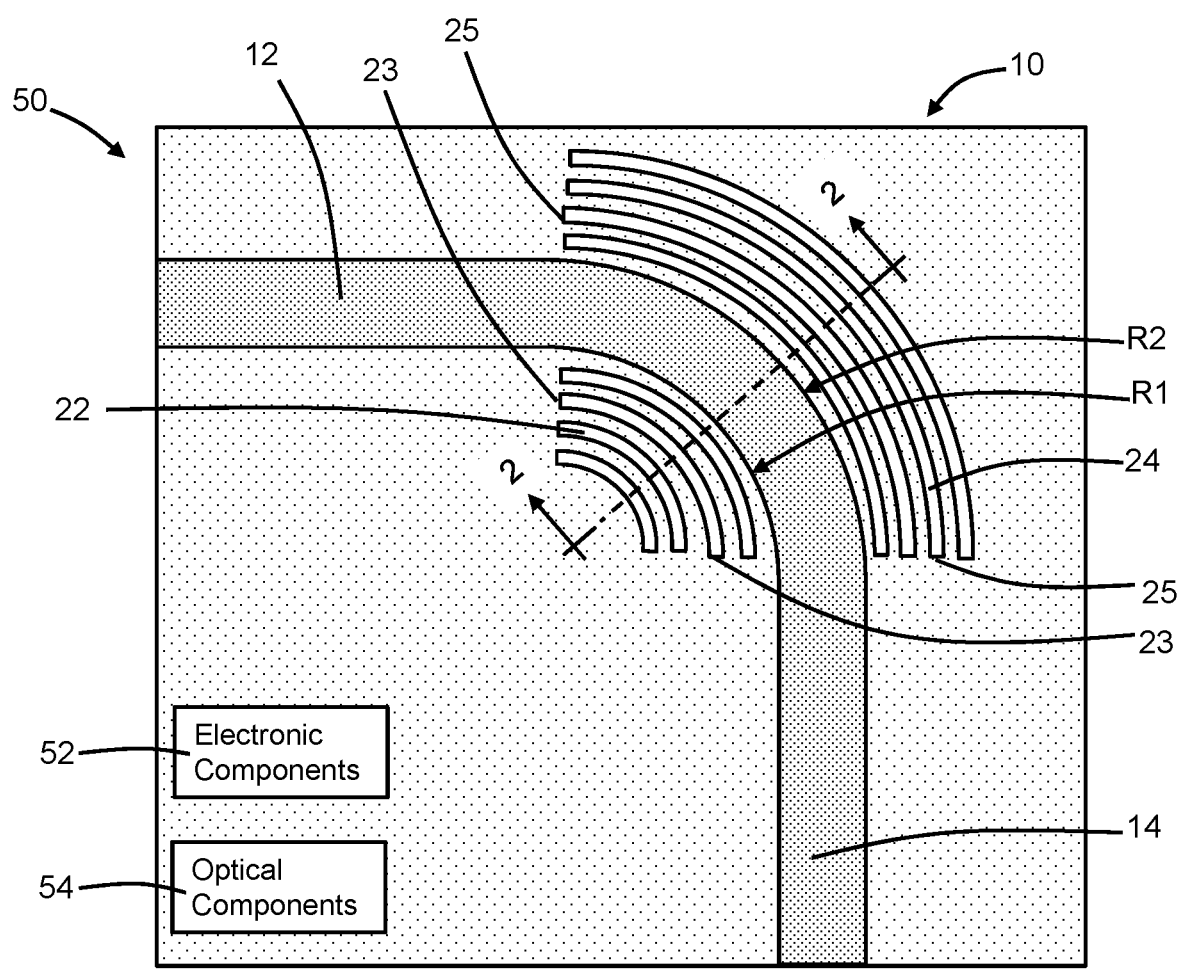
FIG. 1 is a top view of a structure at a fabrication stage of a processing method in accordance with embodiments of the invention.
Figure 2:
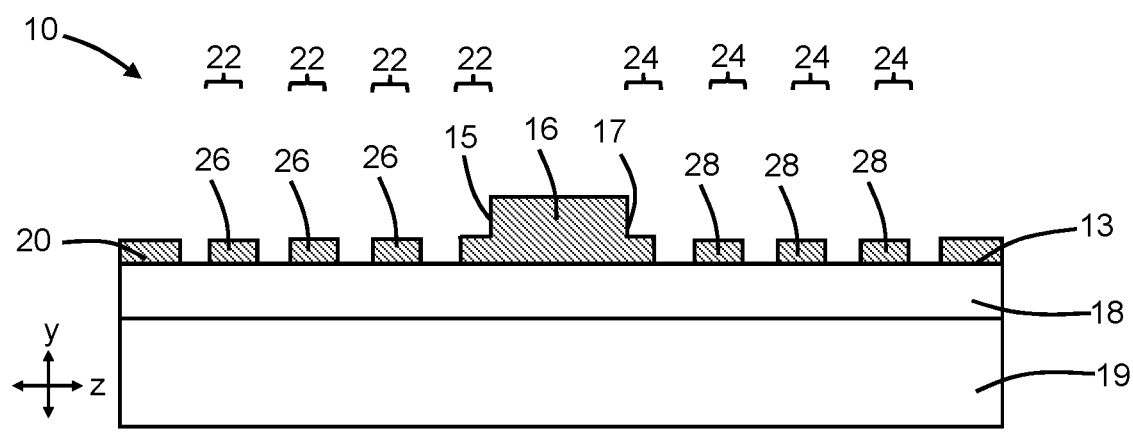
FIG. 2 is a cross-sectional view of the structure taken generally along line 2-2 in FIG. 1.

With reference to FIGS. 1, 2 and in accordance with embodiments of the invention, a structure 10 includes a waveguide core 12, a waveguide core 14, and a waveguide bend 16 that are positioned over a top surface 13 of a dielectric layer 18. The dielectric layer 18 may be composed of an electrical insulator, such as silicon dioxide. In an embodiment, the dielectric layer 18 may be the buried dielectric layer of a silicon-on-insulator (SOI) wafer. The waveguide core 12, waveguide core 14, and waveguide bend 16 may be composed of a single-crystal semiconductor material, such as single-crystal silicon. In an embodiment, the single-crystal semiconductor material may be single-crystal silicon from the device layer of the silicon-on-insulator wafer that is patterned to form the waveguide core 12, waveguide core 14, and the semiconductor bend 16. The SOI wafer may further include a semiconductor substrate 19 on which the dielectric layer 18 is arranged.

A slab layer 20 surrounds the waveguide core 12, waveguide core 14, and waveguide bend 16. The slab layer 20 is directly connected to the lowermost portions of the waveguide core 12, waveguide core 14, and waveguide bend 16, and is located on both sides of the waveguide core 12, waveguide core 14, and waveguide bend 16. The slab layer 20 may be composed of single-crystal semiconductor material (e.g., single-crystal silicon) and is positioned over the dielectric layer 18. The slab layer 20 has a thickness in the vertical direction (i.e., y-direction) that is less than the thickness of the waveguide core 12, waveguide core 14, and waveguide bend 16. The waveguide core 12, waveguide core 14, waveguide bend 16, and slab layer 20 may directly contact the dielectric layer 18.

The waveguide bend 16 has one end connected to the waveguide core 12, and the waveguide bend 16 has an opposite end connected to the waveguide core 14 such that the waveguide bend 16 directly connects the waveguide core 12 with the waveguide core 14. The ends of the waveguide bend 16 may be defined as the locations at which the curvature ceases. The waveguide bend 16 functions to change the direction of guided optical signals from an initial direction within waveguide core 12 to a different direction within waveguide core 14. The waveguide bend 16 may have a curved inner side surface 15 with an inner radius, R1, and a curved outer side surface 17 with an outer radius, R2, that is greater than the inner radius, R1. The waveguide bend 16 may curve in an arc having a central angle equal to 90°, although other central angles (e.g., 45° or 180°) are contemplated. The curved inner side surface 15 is located on an inner concave side of the waveguide bend 16, and the curved outer side surface 17 is located on an outer convex side of the waveguide bend 16.

The structure 10 further includes a series of curved openings 22 that are laterally positioned in the section of the slab layer 20 interior of the curved inner side surface 15 of the waveguide bend 16 and a series of curved openings 24 that are laterally positioned in the section of the slab layer 20 exterior of the curved outer side surface 17 of the waveguide bend 16. In the representative embodiment, each of the curved openings 22 extends through the full thickness of the slab layer 20, and each of the curved openings 24 extends through the full thickness of the slab layer 20. The waveguide core 12, waveguide core 14, and waveguide bend 16 are free of openings similar to curved openings 22, 24.

The curved openings 22 have different respective radii, and the curved openings 24 also have different respective radii. A curved section 26 of the slab layer 20 is arranged as a strip between each adjacent pair of the curved openings 22 and between the waveguide bend 16 and the curved opening 22 nearest to the curved inner side surface 15. A curved section 28 of the slab layer 20 is also arranged as a strip between each adjacent pair of the curved openings 24 and between the waveguide bend 16 and the curved opening 24 nearest to the curved outer side surface 17.

Each of the curved openings 22 has a radius that is less than the radius of the curved inner side surface 15, and the radii of the curved openings 22 progressively decrease with increasing distance from the curved inner side surface 15. Each of the curved openings 24 has a radius that is greater than the radius of the curved outer side surface 17, and the radii of the curved openings 24 progressively increase with increasing distance from the curved outer side surface 17. In an embodiment, the curved openings 22 may be concentric. In an embodiment, the curved openings 24 may be concentric. In an embodiment, the curved openings 22 may be concentric with each other and may also be concentric with the curved inner side surface 15 of the waveguide bend 16. In an embodiment, the curved openings 24 may be concentric. In an embodiment, the curved openings 24 may be concentric with each other and may also be concentric with the curved outer side surface 17 of the waveguide bend 16. The radii of the curved openings 24 are greater than the radii of the curved openings 22 such that the waveguide bend 16 is laterally positioned in the space between the curved openings 22 and the curved openings 24.

Each of the curved openings 22 has opposite terminating ends 23. In an embodiment, the curved openings 22 may each terminate at the end 23 that is proximate to the end of the waveguide bend 16 that is connected to the waveguide core 12. Each of the curved openings 24 has opposite terminating ends 25. In an embodiment, the curved openings 24 may each terminate at the end 23 that is proximate to the end of the waveguide bend 16 that is connected to the waveguide core 14. In an embodiment, the curved openings 24 may each terminate at the end 25 that is proximate to the end of the waveguide bend 16 that is connected to the waveguide core 12. In an embodiment, the curved openings 24 may each terminate at the end 25 that is proximate to the end of the waveguide bend 16 that is connected to the waveguide core 14.

The curved sections 26 of the slab layer 20 and the curved openings 22 provide a grating structure that has a given periodicity or pitch in a direction transverse to the waveguide bend 16. The curved sections 28 of the slab layer 20 and the curved openings 24 provide another grating structure that also has a given periodicity or pitch in the direction transverse to the waveguide bend 16. The pitches of these different grating structures may be either equal or unequal.

The curved sections 26 and/or the curved sections 28 of the slab layer 20 may have a uniform width in a direction transverse to the waveguide bend 16. In an alternative embodiment, the curved sections 26 and/or the curved sections 28 of the slab layer 20 may have a width that varies non-linearly with position in a direction transverse to the waveguide bend 16. The non-linear widths may be selected based on a non-linear function, such as a quadratic, parabolic, or exponential function, in order to provide the variation with position relative to the waveguide bend 16.

The curved sections 26 and/or the curved sections 28 of the slab layer 20 may have constant radii over their respective arc lengths. In an alternative embodiment, the curved sections 26 and/or the curved sections 28 of the slab layer 20 may have radii that vary with position relative to the waveguide bend 16. For example, the radius of each of the curved openings 22 may vary such that the radius is smallest near the ends 23 of the curved openings 22 proximate to the end of the waveguide bend 16 that is connected to the waveguide core 12 and the radius is greatest near the ends 23 of the curved openings 22 proximate to the end of the waveguide bend 16 that is connected to the waveguide core 14. The waveguide bend 16 has an inner radius at the curved inner side surface 15 that is greater than the radii of all of the curved openings 22. The waveguide bend 16 has an outer radius at the curved outer side surface 17 that is less than the radii of all of the curved openings 24.

The proximity of the curved openings 22, 24 to the waveguide bend 16 may function to push the mode field of guided optical signals back into the waveguide bend 16. The improved confinement may reduce bending loss by mitigating mode leakage into the slab layer 20.

In an alternative embodiment, all of the curved openings 24 may be omitted such that only the curved openings 22 are present in the slab layer 20 on one side of the waveguide bend 16. In an alternative embodiment, all of the curved openings 22 may be omitted such that only the curved openings 24 are present in the slab layer 20 on one side of the waveguide bend 16.

The waveguide core 12, waveguide core 14, and waveguide bend 16 may be patterned from a layer of single-crystal semiconductor material with lithography and etching processes. The etching process is controlled and halted before penetrating through the full thickness of the semiconductor layer such that the slab layer 20 is formed. In an embodiment, the waveguide core 12, waveguide core 14, and waveguide bend 16 all have the same thickness in the vertical direction (i.e., y-direction), and the slab layer 20 has a smaller thickness. The curved openings 22, 24 may be patterned in the slab layer 20 with lithography and etching processes. In the representative embodiment, the curved openings 22, 24 may extend through the full thickness of the slab layer 20 to the top surface of the dielectric layer 18. In alternative embodiments, the waveguide core 12, waveguide core 14, waveguide bend 16, and slab layer 20 may be composed of a different material, such as silicon nitride, than single-crystal semiconductor material.

Figure 3:
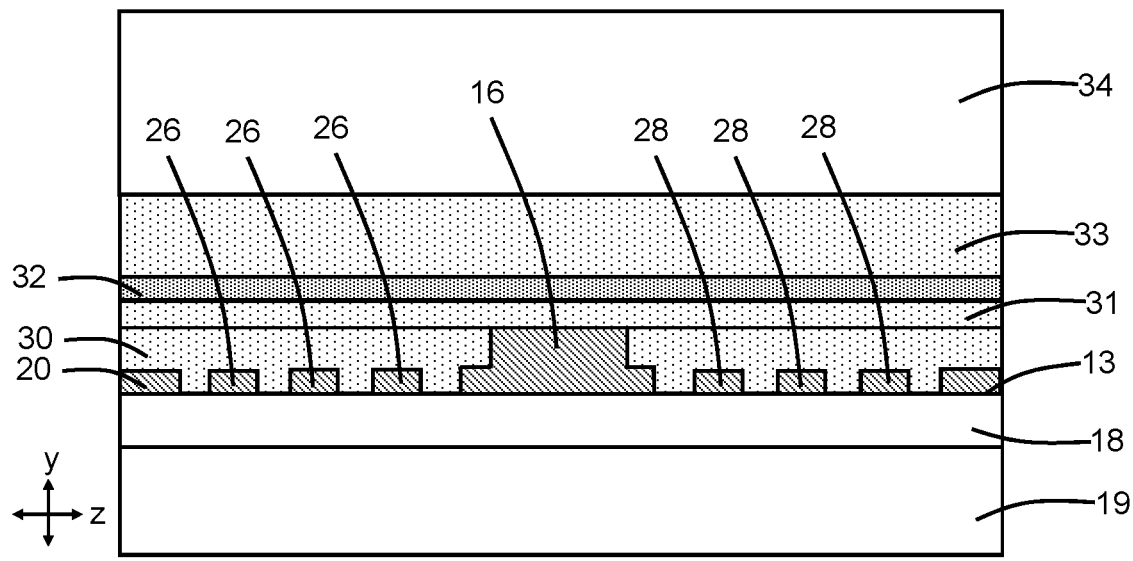
FIG. 3 is a cross-sectional view of the structure at a fabrication stage of the processing method subsequent to FIG. 2.

With reference to FIG. 3 in which like reference numerals refer to like features in FIG. 2 and at a subsequent fabrication stage of the processing method, dielectric layers 30, 31, 32, 33 composed of respective dielectric materials are sequentially formed over the waveguide core 12, waveguide core 14, waveguide bend 16, and slab layer 20. The waveguide core 12, waveguide core 14, waveguide bend 16, and slab layer 20 are embedded or buried in the dielectric material of the dielectric layer 30. Portions of the dielectric layer 30 may fully fill the curved openings 22 and the curved openings 24 in the slab layer 20.

The dielectric layer 31 is positioned over the dielectric layer 30, the dielectric layer 32 is positioned over the dielectric layer 31, and the dielectric layer 33 is positioned over the dielectric layer 31. The dielectric layer 30 may be composed of a dielectric material, such as silicon dioxide, deposited by chemical vapor deposition and planarized with, for example, chemical mechanical polishing to remove topography. The dielectric layer 31 may be composed of dielectric material, such as silicon dioxide, deposited by chemical vapor deposition or atomic layer deposition over the dielectric layer 30. The dielectric layer 32 may be composed of dielectric material, such as silicon nitride, deposited by chemical vapor deposition or atomic layer deposition over the dielectric layer 31. The dielectric layer 33 may be composed of dielectric material, such as silicon dioxide, deposited by chemical vapor deposition or atomic layer deposition over the dielectric layer 32. In an embodiment, the dielectric layer 33 may be composed of a dielectric material, such as silicon dioxide, deposited by chemical vapor deposition using ozone and tetraethylorthosilicate (TEOS) as reactants.

A back-end-of-line stack, generally indicated by reference numeral 34, may be formed over the dielectric layer 33. The back-end-of-line stack 34 may include one or more dielectric layers composed of a dielectric material, such as silicon dioxide or a low-k dielectric material, and metallization composed of a metal, such as copper or cobalt, that is arranged as wiring in the one or more dielectric layers.

The structure 10, in any of its embodiments described herein, may be integrated into a photonics chip 50 (FIG. 1) that includes electronic components 52 and optical components 54. For example, the photonics chip 50 may integrate one or more photodetectors representing optical components 54 that receive optical signals carried by the structure 10 and convert those optical signals into electrical signals that may be processed by the electronic components 52. The electronic components 52 may include field-effect transistors that are fabricated by CMOS front-end-of-line processes using the device layer of the SOI wafer.

Figure 4:
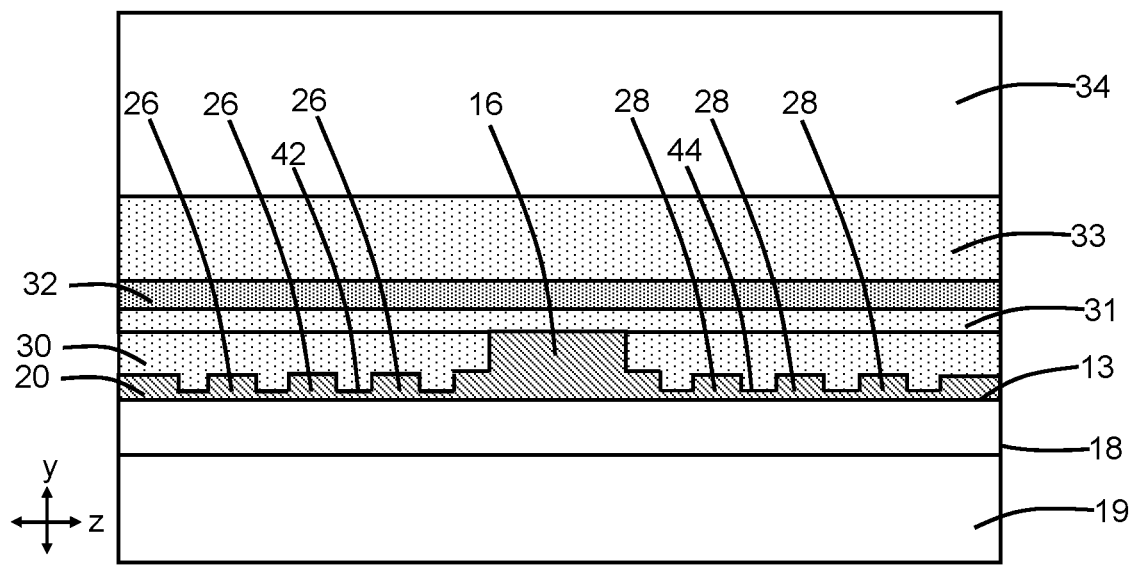
FIGS. 4-6 are cross-sectional views similar to FIG. 3 of structures in accordance with alternative embodiments of the invention.

With reference to FIG. 4 in which like reference numerals refer to like features in FIG. 3 and in accordance with alternative embodiments of the invention, the curved openings 22, 24 may only extend partially through the slab layer 20. In this instance, the etching process forming the curved openings 22, 24 is halted before penetrating fully through the slab layer 20. Portions 36 of the slab layer 20, which are thinner than the curved sections 26 of the slab layer 20, remain intact inside the curved openings 22 and are located adjacent to the dielectric layer 18. Similarly, portions 38 of the slab layer 20, which are thinner than the curved sections 28 of the slab layer 20, remain intact inside the curved openings 24 and are located adjacent to the dielectric layer 18.

Figure 5:
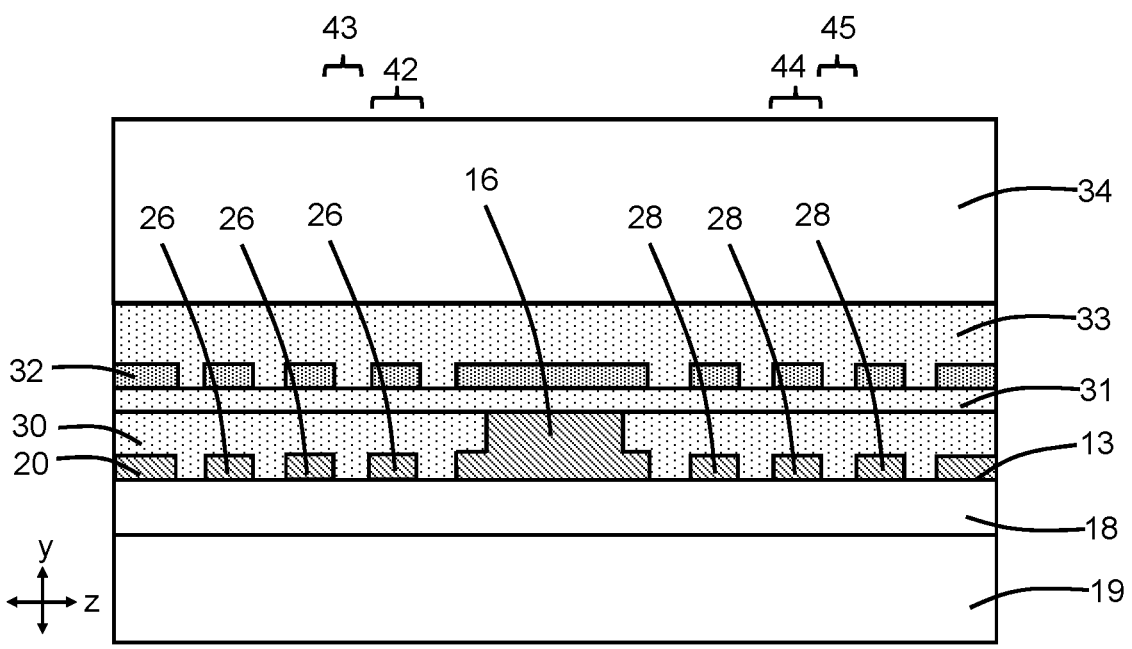

With reference to FIG. 5 in which like reference numerals refer to like features in FIG. 3 and in accordance with alternative embodiments of the invention, the dielectric layer 32 may be patterned with lithography and etching processes to provide curved sections 42 and curved openings 43 between adjacent curved sections 42 that are displaced in a vertical direction and in a lateral direction from the waveguide bend 16 offset inward from the curved inner side surface 15 of the waveguide bend 16. The dielectric layer 32 may also be patterned with lithography and etching processes to provide curved sections 44 and curved openings 45 between adjacent curved sections 44 that are displaced in a vertical direction and in a lateral direction from the waveguide bend 16 outward from the curved outer side surface 17 of the waveguide bend 16. The curved openings 43 forming the curved sections 42 and the curved openings 43 and the curved sections 44 may extend through the full thickness of the dielectric layer 32 such that respective curved gratings are defined in the dielectric layer 32. In an embodiment, the curved sections 42 and associated curved openings 43 may be respectively positioned directly over the curved sections 26 and the associated curved openings 22, and the curved sections 44 and associated curved openings 45 may be positioned directly over the curved sections 28 and the associated curved openings 24.

Figure 6:
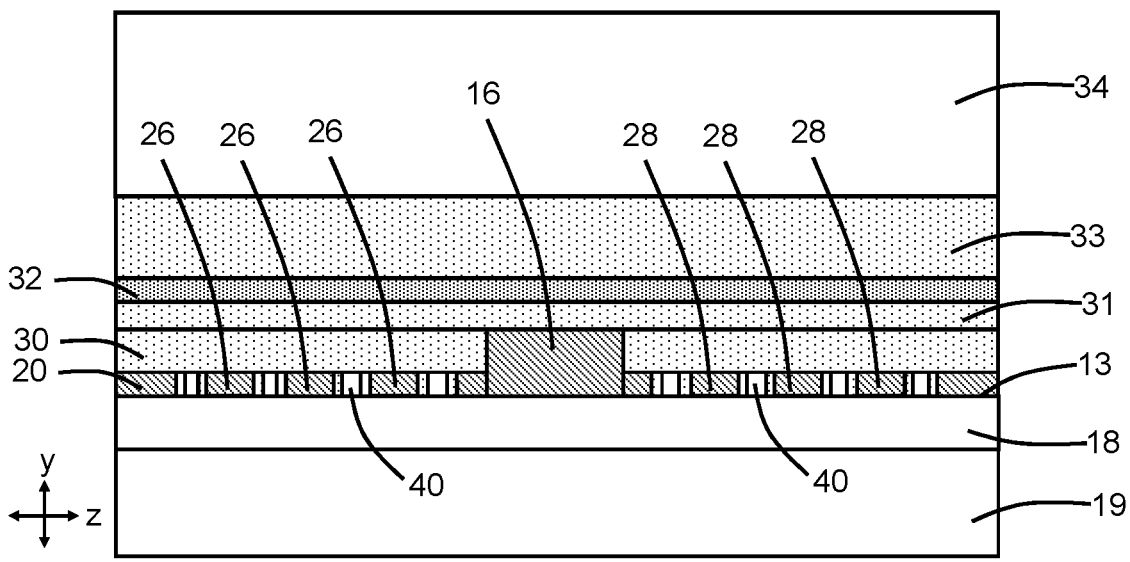

With reference to FIG. 6 in which like reference numerals refer to like features in FIG. 3 and in accordance with alternative embodiments of the invention, the dielectric layer 30 may be deposited such that the curved openings 22 and the curved openings 24 in the slab layer 20 are only partially filled with solid dielectric material. The partial filling of the curved openings 22 may encapsulate air gaps 40 in the spaces provided between the curved sections 26 of the slab layer 20. The partial filling of the curved openings 24 may encapsulate air gaps 40 in the spaces provided between the curved sections 28 of the slab layer 20. The air gaps 40 may be surrounded by dielectric material from the dielectric layer 03.

Figure 7:
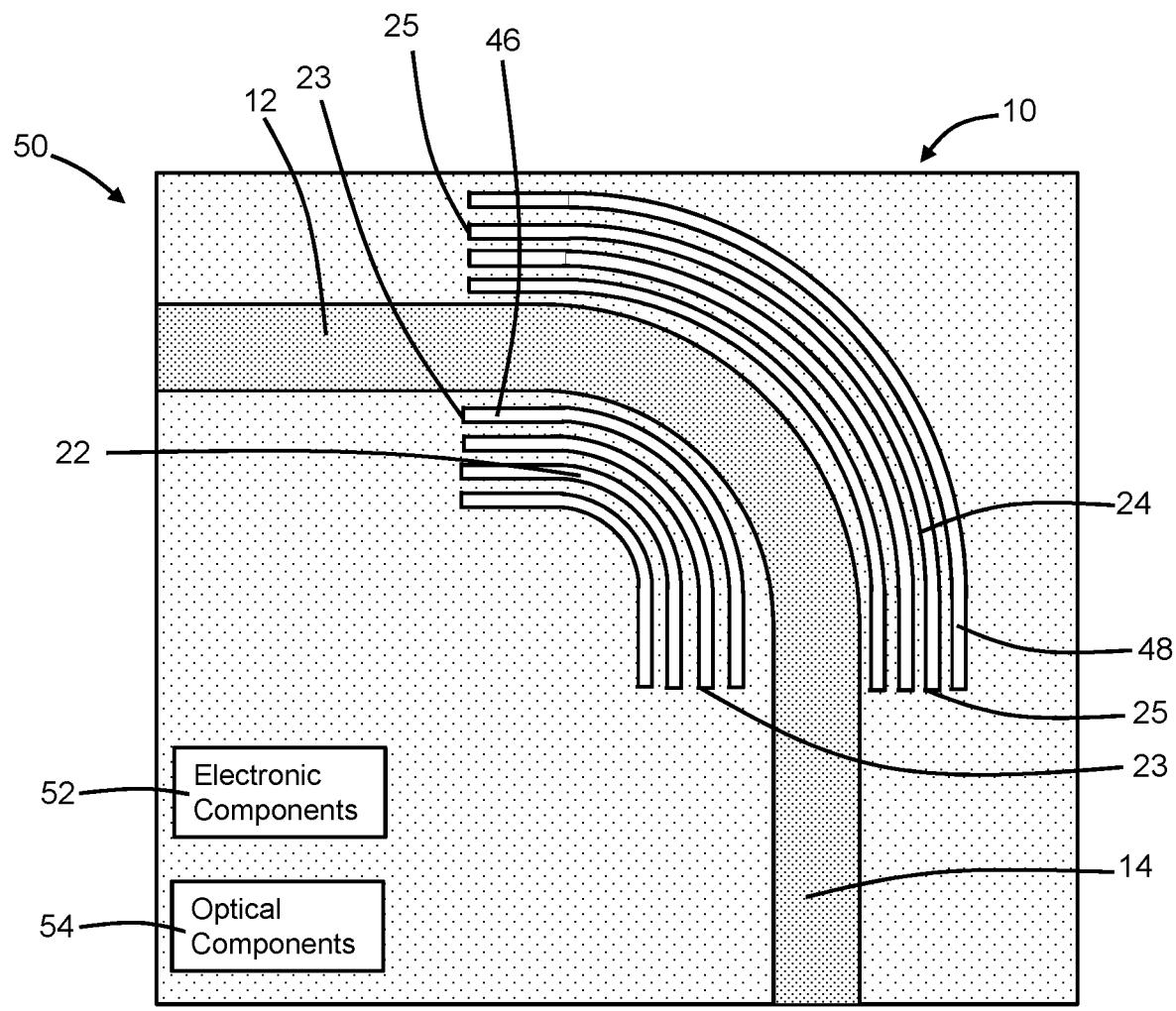
FIG. 7 is a top view similar to FIG. 1 of a structure in accordance with alternative embodiments of the invention.

With reference to FIG. 7 in which like reference numerals refer to like features in FIG. 1 and in accordance with alternative embodiments of the invention, extension openings 46 may be formed in the slab layer 20 and appended to the curved openings 22 to relocate one or both of the ends 23, and extension openings 48 may be formed in the slab layer 20 and appended to the curved openings 24 to relocate one or both of the ends 25. The extension openings 46 may be straight or substantially straight sections that extend parallel or substantially parallel to the waveguide core 12, and the extension openings 48 may be straight or substantially straight sections that extend parallel or substantially parallel to the waveguide core 14. The extension openings 46, 48 may be formed when the curved openings 22, 24 are patterned.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
   a first dielectric layer;
   a waveguide core positioned on the first dielectric layer;
   a waveguide bend positioned on the first dielectric layer, the waveguide bend connected to the waveguide core, and the waveguide bend having a first side surface; and
   a slab layer positioned on the first dielectric layer, the slab layer directly connected to a lowermost portion of the waveguide core and a lowermost portion of the waveguide bend, the slab layer being thinner than the waveguide bend, the slab layer including a first curved opening, a second curved opening positioned between the first curved opening and the first side surface of the waveguide bend, and a first section positioned between the first curved opening and the second curved opening, the first curved opening having a first radius, and the second curved opening having a second radius that is greater than or less than the first radius of the first curved opening.

2. The structure of claim 1 wherein the waveguide core, the waveguide bend, and the slab layer are comprised of single-crystal silicon.

3. The structure of claim 1 wherein the first side surface is located at an inner convex side of the waveguide bend, and the second radius of the second curved opening is greater than the first radius of the first curved opening.

4. The structure of claim 1 wherein the first side surface is located at an outer concave side of the waveguide bend, and the second radius of the second curved opening is less than the first radius of the first curved opening.

5. The structure of claim 1 wherein the waveguide bend includes a second side surface, the slab layer includes a third curved opening, a fourth curved opening positioned between the third curved opening and the second side surface of the waveguide bend, and a second section positioned between the third curved opening and the fourth curved opening, the third curved opening has a third radius, and the fourth curved opening has a fourth radius that differs from the third radius of the third curved opening.

6. The structure of claim 5 wherein the third radius of the third curved opening is greater than the fourth radius of the fourth curved opening, and the second radius of the second curved opening is less than the first radius of the first curved opening.

7. The structure of claim 6 wherein the third curved opening and the fourth curved opening are concentric, and the first curved opening and the second curved opening are concentric.

8. The structure of claim 1 wherein the first curved opening and the second curved opening are concentric.

9. The structure of claim 1 wherein the first curved opening and the second curved opening extend fully through the slab layer.

10. The structure of claim 1 wherein the first curved opening and the second curved opening extend fully through the slab layer to the first dielectric layer.

11. The structure of claim 1 wherein the first curved opening and the second curved opening extend partially through the slab layer.

12. The structure of claim 1 further comprising:
    a second dielectric layer over the waveguide bend,
    wherein the second dielectric layer includes a first curved opening and a second curved opening over the slab layer, and the first curved opening and the second curved opening in the second dielectric layer are laterally spaced from the first side surface of the waveguide bend.

13. The structure of claim 12 wherein the first curved opening in the second dielectric layer is positioned directly over the first curved opening in the slab layer, and the second curved opening in the second dielectric layer is positioned directly over the second curved opening in the slab layer.

14. The structure of claim 1 wherein the first curved opening and the second curved opening are filled by dielectric material.

15. The structure of claim 1 wherein the first curved opening and the second curved opening include air gaps.

16. The structure of claim 1 wherein the slab layer includes a first extension opening that is appended to the first curved opening and a second extension opening that is appended to the second curved opening, and the first extension opening and the second extension opening each extend substantially parallel to the waveguide core.

17. A method comprising:
    forming a waveguide core, a waveguide bend connected to the waveguide core, and a slab layer directly connected to a lowermost portion of the waveguide core and a lowermost portion of the waveguide bend; and
    forming a first curved opening in the slab layer and a second curved opening in the slab layer that is positioned between the first curved opening and a first side surface of the waveguide bend, wherein the waveguide core, the waveguide bend, and the slab layer are positioned on a dielectric layer, the slab layer is thinner than the waveguide bend, a first section of the slab layer is positioned between the first curved opening and the second curved opening, and the second curved opening has a second radius that is greater than or less than a first radius of the first curved opening.

18. The method of claim 17 wherein the second radius of the second curved opening is less than the first radius of the first curved opening.

19. The method of claim 17 wherein the second radius of the second curved opening is greater than the first radius of the first curved opening.

20. The method of claim 17 wherein the waveguide bend includes a second side surface, the slab layer includes a third curved opening, a fourth curved opening positioned between the third curved opening and the second side surface of the waveguide bend, and a second section positioned between the third curved opening and the fourth curved opening, the third curved opening has a third radius, and the fourth curved opening has a fourth radius that differs from the third radius of the third curved opening.

\* \* \* \* \*